United States Patent
Gruber et al.

(12) 
(10) Patent No.: US 6,703,117 B2
(45) Date of Patent: Mar. 9, 2004

(54) FRICTION BODY OR SLIDING BODY FORMED FROM COMPOSITE MATERIALS REINFORCED WITH FIBER BUNDLES AND CONTAINING A CERAMICS MATRIX AND PROCESS FOR THE PRODUCTION OF A FRICTION OR SLIDING BODY

(75) Inventors: Udo Gruber, Neusäss (DE); Michael Heine, Allmannshofen (DE); Andreas Kienzle, Thierhaupten (DE)

(73) Assignee: SGL Carbon AG, Wiesbaden (DE)

( * ) Notice: Subject to any disclaimer, the term of this patent is extended or adjusted under 35 U.S.C. 154(b) by 0 days.

(21) Appl. No.: 10/156,535

(22) Filed: May 28, 2002

(65) Prior Publication Data

US 2003/0003286 A1 Jan. 2, 2003

Related U.S. Application Data

(63) Continuation of application No. PCT/DE01/03669, filed on Sep. 24, 2001.

(30) Foreign Application Priority Data

Sep. 26, 2000 (DE) .......................... 100 48 012

(51) Int. Cl.[7] .......................... D04H 1/00; D04H 13/10; D04H 3/00; D04H 5/00; B32B 21/02; B32B 21/10; B32B 9/80; B32B 19/00; B32B 17/06; B32B 9/04; B60T 1/06; F16D 65/041

(52) U.S. Cl. .............................. 428/292.1; 428/294.1; 428/408; 428/698; 428/704; 428/426; 18/218; 18/250; 18/251; 18/256; 266/239; 266/289; 501/95; 501/99; 192/107; 106/44

(58) Field of Search .......................... 428/294.1, 292.1, 428/698, 408, 426, 704; 188/18, 218, 250, 251, 256; 266/239, 289; 501/95, 99; 192/107; 106/44

(56) References Cited

U.S. PATENT DOCUMENTS

| 5,192,475 | A | * | 3/1993 | Tredway ..................... 264/115 |
| 5,242,746 | A |   | 9/1993 | Bommier et al. ........... 428/252 |
| 5,975,270 | A | * | 11/1999 | Tokune et al. ......... 192/107 M |
| 6,030,913 | A |   | 2/2000 | Heine et al. ................. 501/88 |
| 6,042,935 | A |   | 3/2000 | Krenkel et al. .......... 428/307.7 |
| 6,079,525 | A |   | 6/2000 | Dietrich et al. ............. 428/212 |
| 6,193,027 | B1 | * | 2/2001 | Krenkel et al. ....... 188/218 XL |
| 6,231,791 | B1 |   | 5/2001 | Heine et al. ................ 264/29.5 |
| 6,261,981 | B1 |   | 7/2001 | Dietrich et al. ............ 501/95.2 |
| 6,302,246 | B1 | * | 10/2001 | Naumann et al. ...... 188/218 XL |
| 6,335,105 | B1 | * | 1/2002 | McKee ........................ 428/623 |
| 6,355,206 | B1 | * | 3/2002 | Hanzawa et al. ........... 266/239 |
| 2003/0138672 | A1 | * | 7/2003 | Bauer et al. ................. 428/698 |

FOREIGN PATENT DOCUMENTS

| DE | 198 05 868 A1 | 10/1989 |
| DE | 44 38 456 A1 | 5/1996 |
| DE | 197 10 105 A1 | 9/1998 |
| DE | 197 11 829 C1 | 9/1998 |
| DE | 197 11 831 A1 | 9/1998 |
| DE | 197 27 586 A1 | 2/1999 |
| DE | 198 34 542 A1 | 2/2000 |
| DE | 198 34 704 A1 | 2/2000 |
| DE | 199 01 215 A1 | 7/2000 |
| DE | 199 44 345 A1 | 3/2001 |
| JP | 02 1884 575 A | 7/1990 |
| JP | 03 174 359 A | 7/1991 |
| JP | 04 224 884 A | 8/1992 |
| WO | WO 99/41069 | 8/1999 |

* cited by examiner

*Primary Examiner*—Cynthia H. Kelly
*Assistant Examiner*—Camie S. Thompson
(74) *Attorney, Agent, or Firm*—Laurence A. Greenberg; Werner H. Stemer; Gregory L. Mayback

(57) ABSTRACT

A friction or sliding body includes at least two composite materials reinforced with fiber bundles and containing a ceramics matrix. A first composite material forms the outside of the sliding body as a friction layer and a second composite material forms a supporting body joined areally to the friction layer. The fiber bundle lengths of the friction layer are significantly shorter than the fiber bundle lengths of the supporting body. The fiber bundles of the friction layer have a clear alignment perpendicular to the surface. The surface of the friction layer is formed substantially only of small regions of free carbon with a diameter of at most 1.2 mm, and a total fraction of the area of free carbon on the surface is at most 35%. The surface has an extremely fine crack structure and the friction layer exhibits virtually no stresses in the vicinity of the surface. A process for producing a friction or sliding body and a brake disc or brake lining are also provided.

38 Claims, No Drawings

FRICTION BODY OR SLIDING BODY FORMED FROM COMPOSITE MATERIALS REINFORCED WITH FIBER BUNDLES AND CONTAINING A CERAMICS MATRIX AND PROCESS FOR THE PRODUCTION OF A FRICTION OR SLIDING BODY

CROSS-REFERENCE TO RELATED APPLICATION

This application is a continuation of copending International Application No. PCT/DE01/03669, filed Sep. 24, 2001, which designated the United States and was not published in English.

BACKGROUND OF THE INVENTION

Field of the Invention

The present invention relates to friction or sliding bodies formed from at least two composite materials reinforced with fiber bundles and containing a ceramics matrix. A first composite material forms the outside of the sliding body and a second composite material is joined in an areal manner to the first composite material. The invention also relates to a process for the production of friction bodies or sliding bodies formed of at least two composite materials reinforced with fiber bundles and containing a ceramics matrix. Again, a first composite material forms the outside of the friction body or sliding body and a second composite material is joined in an areal manner to the first composite material.

Composite materials reinforced with high temperature resistant fibers and/or fiber bundles and containing a ceramics matrix have been known for about 10 years and are used in many applications where extremely high requirements are placed on a material, such as high temperature resistance combined with strength and ductility. Those requirements are demanded in particular of frictional or sliding partners.

The extent to which composite materials reinforced with fibers and/or fiber bundles and containing a ceramics matrix, referred to below as CMC composite materials for the sake of brevity, can be used in the sphere of applications having high temperature requirements depends not in the least on the structure of the matrix of the composite materials and in particular on the structure of their surface. As long as the matrix of the composite materials is composed of different phases, the matrix structure on the surface of the CMC composite materials can be damaged by the dissolving out of a matrix phase that melts at relatively low temperatures and that can be attacked by chemical processes such as oxidation, as a result of which the useful life of the CMC composite materials is currently restricted. Those problems become all the greater if a CMC material is, in addition, subjected to mechanical wear. In that connection, new crystallites of the matrix which are constantly being exposed can be attacked even at relatively low temperatures and those crystallites are thereby very rapidly degraded. Furthermore, interstices in the matrix composite formed by the dissolved-out crystallites provide an opportunity for increased mechanical attack.

Areas of use of CMC composite materials in which mechanical stress plays a significant role include, for example, the use of CMC elements as sliding bearing components and friction linings such as brake discs and brake linings. Initially, composite materials reinforced in particular with carbon fibers and containing a carbon matrix, so-called CFC composite materials, were used in the friction linings sector. However, those CFC composites have the disadvantage of an insufficient temperature resistance of the material to oxidative attack. Attempts have therefore been made in the meantime to replace the carbon matrix of the composite material with a more oxidation resistant matrix. In that connection, SiC matrices that are resistant to oxidation at significantly higher temperatures (1500° C.) and with or without any additional surface protective layer are used, in particular. As a result, composite materials reinforced with carbon fibers and containing an SiC matrix, referred to below as C/SiC composite materials, are nowadays mainly used for friction linings such as brake discs and brake linings.

A number of processes for producing C/SiC composite materials have been developed in the meantime, in particular also with the intention of using such materials as components of brake systems. For example, processes for the production of C/SiC composite materials are described in German Published, Non-Prosecuted Patent Application DE 197 10 105 A1, corresponding to U.S. Pat. Nos. 6,231,791 and 6,030,913, and German Patent DE 197 11 829 C1, corresponding to U.S. Pat. No. 6,261,981, in which fiber bundles provided with at least one carbon layer and/or with a reinforced binder layer are mixed with carbon-containing binders with or without fillers, following which the mixtures are compressed and hardened before being carbonized, possibly graphited, and finally infiltrated with liquid silicon. Sliding bodies and friction bodies which have also heretofore been produced from these materials, then are formed homogeneously of one material.

All sliding and friction bodies of C/SiC composite materials produced heretofore according to the above-described processes have an inhomogeneous structure of the matrix, which in the case of processes according to German Published, Non-Prosecuted Patent Application DE 197 10 105 A1, corresponding to U.S. Pat. Nos. 6,231,791 and 6,030,913, and German Patent DE 197 11 829 C1, corresponding to U.S. Pat. No. 6,261,981 is reflected in the fact that the matrix also contains phases of pure carbon and/or silicon and there is therefore not a homogeneous matrix composition. The carbon regions oxidize under relatively high temperature stress, i.e. burn-out from the composite material, and the silicon regions already melt at a temperature of about 1400° C. Accordingly, it has not heretofore been possible, using those processes, to obtain a matrix structure of C/SiC composite materials that is capable of withstanding prolonged thermal stresses at high temperatures, particularly not when exposed to additional mechanical stress. Those stresses occur in particular on the surface of the friction body or sliding body in addition to the burn-outs. As a result, the surface exhibits a rough appearance over the course of time and thus the surface available for the sliding or friction process is reduced.

In a process for the production of C/SiC composite materials described in German Published, Non-Prosecuted Patent Application DE 199 44 345 A1, corresponding to copending U.S. application Ser. No. 09/663,582, filed Sep. 18, 2000, it has for the first time become possible to produce a C/SiC composite material that has as low a proportion of the silicon and carbon phase as possible and a grain structure with cracks that do not exert a negative effect under mechanical stress. The composite material which is reinforced with fiber bundles and contains a ceramics matrix that is produced thereby, includes fiber bundles which are formed of two different fractions having different mean fiber bundle lengths. Those two fiber bundle fractions in the total fiber bundle distribution of the mass of the fiber bundles of the composite material are separated with respect to fiber bundle length by a minimum of the fiber bundle distribution. Even if the carbon fraction in the matrix has been significantly reduced in those composite materials, the problem still remains, in particular as a result of the mechanical processing of the composite materials, that free carbon regions always still exist on the surface of the composite material due to the carbon fiber bundles. As a result, the fiber bundles on the surface are burnt out under high temperature stresses in an oxidative atmosphere, which can be observed in particular after brake discs, for example, have been subjected to intensive stress.

One way of resolving that problem is for the supporting core of friction and sliding bodies to be formed of a different material than the outer friction layer, which is described, for example, in German Published, Non-Prosecuted Patent Application DE 44 38 456 A1, corresponding to U.S. Pat. No. 6,042,935. The conventionally employed CMC composite materials, for example CFC composite materials as well, can be used for the supporting core. However, the material of the outer friction layer should be modified so as to avoid a burning-out of the fiber bundles close to the surface. A first attempt in that direction is described in German Published, Non-Prosecuted Patent Application DE 198 05 868 A1, in which various compression molding materials are compressed in a single compression process to form a molded body that then has at least two superimposed layers of a CMC composite material. The fibers in the two layers have different protective coatings or quantitative amounts. In particular, the technology for producing the afore-described molded bodies resides in that the outer layer, i.e. the friction layer, is formed largely or completely of silicon carbide since the fibers of the friction layer are largely or even completely consumed during the siliciding process. However, in the practical use of such friction or sliding bodies it has been found that under the high prevailing temperature stresses, exfoliation of parts of the friction layer may occur as a result of the different coefficients of thermal expansion of the supporting layer and the friction layer. The supporting friction layer is thus destroyed over the course of time, with the result that over time its intended positive action proves to be a disadvantage in those friction and sliding bodies.

A further possible way of producing a friction ring of a supporting body and an outer friction layer is described in German Published, Non-Prosecuted Patent Application DE 198 34 704 A1. The supporting body thereof contains fabric linings formed from carbon fibers as a reinforcement, while the friction layer is reinforced with short fibers. However, the problems of the burning-out of fibers in the surface region in the case of friction layers reinforced with short fibers occur exactly as already described above for sliding and friction bodies that are formed of only one composite material.

Heretofore it has not been possible to find a CMC sliding body or friction body that, in particular, is formed wherever possible of a homogeneous material or also of at least one supporting body and at least one friction surface and that still exhibits an almost intact surface after high thermal and oxidative stress.

SUMMARY OF THE INVENTION

It is accordingly an object of the invention to provide friction and sliding bodies based on composite materials reinforced with fiber bundles and containing a ceramics matrix, as well as a process for producing such composite materials, having a surface which has been modified by an outer friction layer in contrast to the composite materials of the prior art formed of the known sliding and friction bodies based on composite materials reinforced with fiber bundles and containing a ceramics matrix. Therefore, the surface exhibits neither exfoliation nor large regions containing burn-outs, even after high temperature stresses in an oxidative atmosphere.

With the foregoing and other objects in view there is provided, in accordance with the invention, a friction or sliding body, comprising at least first and second composite materials reinforced with fiber bundles and containing a ceramics matrix. The first composite material acts as a friction layer and forms an outside with an outer surface, and the second composite material acts as a supporting body and is joined areally to the first composite material. The at least first and second composite materials have different fractions of fiber bundles, namely a reinforcing fiber bundle fraction and a matrix fiber bundle fraction with different mean fiber bundle lengths and an overall fiber bundle distribution with a minimum fiber bundle length of fiber bundles incorporated in the composite material. The minimum lies between the mean fiber bundle lengths of the reinforcing fiber bundle fraction and the matrix fiber bundle fraction. The fiber bundle lengths of the fiber bundles incorporated in the first composite material are significantly shorter than the fiber bundle lengths of the fiber bundles incorporated in the second composite material. The fiber bundles of the first composite material have, on average, a distinct alignment perpendicular to the outer surface. The outer surface has to a relatively large extent only small regions of free carbon with a maximum diameter of 1.2 mm. The free carbon has a surface area with a total fraction being at most 35% of the outer surface. The outer surface has an extremely fine crack structure and substantially no stresses in the vicinity of the outer surface.

With the objects of the invention in view, there is also provided a process for the production of a friction or sliding body, which comprises providing at least first and second composite materials reinforced with fiber bundles and containing a ceramics matrix. An outside of the friction or sliding body is formed from the first composite material as a friction layer, and the second composite material is joined areally to the first composite material as a supporting body. The at least first and second composite materials are produced from different fractions of fiber bundles as starting substances, namely a reinforcing fiber bundle fraction and a matrix fiber bundle fraction having different mean fiber bundle lengths with an overall fiber bundle distribution having a minimum fiber bundle length of fiber bundles incorporated in the composite materials. The minimum lies between mean fiber bundle lengths of the reinforcing fiber bundle fraction and the matrix fiber bundle fraction. The fiber bundle lengths of the fiber bundles incorporated in the first composite material are substantially shorter than the fiber bundle lengths of the fiber bundles incorporated in the second composite material. The first composite material is produced by mixing the two fiber bundle fractions together with a binder, and initially granulating after the mixing.

The friction and sliding bodies according to the invention are distinguished by the fact that, even after long use under very high temperatures in an oxidative environment, the friction layer has a virtually still undamaged friction surface. This is made possible by a special structure, in which the friction layer is joined to the supporting body. Although the friction layer does indeed also exhibit cracks due to the stresses that arise upon cooling after the siliciding or due to high temperature stress, these cracks are propagated only to a limited extent on the surface of the friction layer. The crack width in the transition region of the layers is often substantially larger than in the vicinity of the surface. The favorable structure of the friction layer is reinforced by the fact that the fiber bundles contained therein are aligned to a relatively large extent at least in part perpendicular to the surface of the friction layer. However, the fiber bundles in the supporting material are aligned almost parallel to the boundary layer of the layers. It has surprisingly been found that the friction or sliding bodies according to the invention have, due to their special composition and production, a structure in the composite material that permits only relatively small damage to the surface due to burning-out and moreover does not permit exfoliation of the friction layer. As the afore-described prior art shows, this has become possible only by the discovery of a suitable combination of features of the friction and sliding bodies.

The fact that a burning-out, in particular of fiber bundles on the friction surface in the friction or sliding bodies according to the invention, is possible only to a very limited extent, is reflected in the fraction of the friction surface that is formed of carbon and wherever possible has been subjected to mechanical reworking. In the friction and sliding bodies according to the invention, this fraction is normally between 2% and 35% of the surface area, preferably between 5% and 30% and particularly preferably between 15% and 25% of the surface area. Additionally, the fraction of the surface that exhibits larger regions of free carbon on the surface is small. Thus, normally between 1.5% and 30% of the surface area, preferably between 4% and 25% and particularly preferably between 12% and 20% of the surface area exhibit regions of free carbon on the surface, which have a maximum diameter of at least 1.2 mm.

The present invention is distinguished by the fact that the previously known processes for the production of CMC composite materials can be used for the production of the at least two composite materials if, instead of as heretofore, only one fiber fraction or fiber bundle fraction, a reinforcing fiber bundle fraction and a matrix fiber bundle fraction are incorporated in the composite materials, and, in order to produce the friction surface, the mixture containing both fiber bundle fractions is granulated after its formation. The known advantages of the previous production processes are thus still retained.

The friction and sliding bodies according to the invention have different layers of composite materials reinforced with fiber bundles, in the simplest case having a supporting body with a friction layer applied on one side thereof, which is often the case, for example, in sliding bearing elements. Often, however, the supporting body has a friction layer on both sides that is formed for the most part of the same composite material. Such a structure is used, for example, as a brake disc. The various composite materials from which the friction or sliding bodies are composed may have a sharp transition and a smooth transition on their common interface. Furthermore, one or more transition layers may also be disposed between the outer-lying friction layer and the supporting body, in order to thereby achieve a better matching of the material parameters, such as in particular the coefficient of thermal expansion, of the supporting layer and the friction layer. In this way the friction layer can be applied in a virtually stress-free manner to the inner support.

The geometry of the friction bodies may have any arbitrary shape, the only essential condition being an areal contact between the individual layers. However, on contact, the surface of the friction layer may project beyond that of the supporting body, and vice versa. It is also possible for several friction layer elements to be disposed adjacent one another on the supporting body.

With brake discs that are provided on one or both sides with friction layers, the thickness of each friction layer is normally chosen to be between 1% and 25% of the thickness of the overall brake disc, preferably between 3% and 15% and particularly preferably between 5% and 12% of the thickness of the overall brake disc.

The fiber bundles that contain the friction and sliding bodies according to the invention or that are used in the process according to the invention for producing the friction and sliding bodies, preferably have a protective layer in order to protect them against too strong an attack upon reaction with the matrix system, so that they do not lose their reinforcing properties. A continuing protection of the fiber bundles incorporated in the friction and sliding bodies according to the invention can be achieved by placing several, wherever possible different, protective layers over one another. The preferably used protective layers are formed of carbon, graphite, pyrolytic carbon, TiC, TiN, SiC, titanium diboride, zirconium diboride, hafnium diboride, compounds based on Si, B, C, N and mixtures thereof. A different or additional fiber bundle protection can be achieved by coating the fiber bundles used in the production with at least one layer of a pyrolyzable binder that has been compacted or hardened. In particular, such coated fiber bundles can also be used in the production processes according to the invention. The protective layer is pyrolized during the production of the individual composite materials of the friction or sliding rings according to the invention. The protective layers of the fiber bundles may be different from the supporting body and friction surface, though preferably they are the same due to simpler manufacture.

In order to reinforce the friction and sliding bodies according to the invention as well as in the production processes according to the invention, any high temperature resistant fibers may be used, but in particular carbon fibers, graphite fibers, SiC fibers, aluminum oxide fibers, $Al_2O_3SiO_2$ fibers, $Al_2O_3SiO_2B_2O_3$ fibers, carbonized forms of cellulose fibers, wood fibers and other organic fibers, as well as highly heat-resistant fibers based on compounds containing Si, C, B, N and Al. Nanofibers, whiskers and small nanotubes may likewise also be used for reinforcing the CMC composite material, as well as in production of the fiber bundles, instead of the fibers contained in the fiber bundles.

The correct choice of the reinforcing fiber bundles also makes a significant contribution to the high durability of the surface of the friction layers. On one hand the composite materials have two different fiber bundle fractions of different fiber bundle lengths which, according to German Published, Non-Prosecuted Patent Application DE 199 44 345 A1, corresponding to copending U.S. application Ser. No. 09/663,582, filed Sep. 18, 2000, leads to an improved structure of the matrix of the composite materials and, on the other hand, shorter fiber bundles are used in the friction layer than in the supporting body. However, the shorter fiber bundles preferably have the same protective layer as the fiber bundles of the supporting layer, so that they do not lose their reinforcing character, for example by a siliciding. The protective layer of the fiber bundles is particularly preferably a carbon layer that has been graphited.

Preferred variants of the friction and sliding bodies according to the invention have fiber bundles for the purposes of reinforcement that are distinguished by the following features.

Those fiber bundles contained in the individual composite materials will be described below and in the claims as so-called fiber bundle distributions. Furthermore, as described below, the mass distribution of the fiber bundles contained in the respective composite material is to be understood with reference to the length of the fiber bundles. In other words, the mass of the fiber bundles of a specific fiber bundle length or the mass fraction of the fiber bundles of a specific fiber bundle length relative to the total mass of the fiber bundles, can be deduced from the distribution.

The fiber bundle distributions are distinguished, in particular, by the following properties:

The mean fiber bundle length of the reinforcing fiber bundle fraction of the supporting body is usually between 4 mm and 20 mm, preferably between 5 mm and 16 mm, and particularly preferably between 6 mm and 12 mm.

The mean fiber bundle length of the matrix fiber bundle fraction of the supporting body is usually between 0.2 mm and 5 mm, preferably between 0.5 mm and 4 mm, and particularly preferably between 1 mm and 3.5 mm.

The mean fiber bundle width of the reinforcing fiber bundle fraction of the supporting body is usually between 0.02 mm and 5 mm, preferably between 0.1 mm and 3 mm, and particularly preferably between 0.5 mm and 2 mm.

The mean fiber bundle width of the matrix fiber bundle fraction of the supporting body is usually between 0.02 mm and 2 mm, preferably between 0.1 mm and 1 mm, and particularly preferably between 0.3 mm and 0.7 mm.

The mean fiber bundle length of the reinforcing fiber bundle fraction of the friction layer is usually between 0.5 mm and 8 mm, preferably between 1 mm and 6 mm, and particularly preferably between 2 mm and 4 mm.

The mean fiber bundle length of the matrix fiber bundle fraction of the friction layer is usually between 0.25 mm and 4 mm, preferably between 0.5 mm and 3 mm, and particularly preferably between 1 mm and 2 mm.

The mean fiber bundle width of the reinforcing fiber bundle fraction of the friction layer is usually between 0.01 mm and 1.5 mm, preferably between 0.1 mm and 1 mm, and particularly preferably between 0.3 mm and 0.7 mm.

The mean fiber bundle width of the matrix fiber bundle fraction of the friction layer is usually between 0.001 mm and 0.6 mm, preferably between 0.05 mm and 0.4 mm, and particularly preferably between 0.1 mm and 0.2 mm.

The ratio of the mean fiber bundle length of the reinforcing fiber bundle fraction to the mean fiber bundle length of the matrix fiber bundle fraction of the supporting body is usually between 1.5 and 10, preferably between 1.8 and 7, and particularly preferably between 2.1 and 5.

The ratio of the mean fiber bundle length of the reinforcing fiber bundle fraction to the mean fiber bundle length of the matrix fiber bundle fraction of the friction layer is usually between 1.35 and 7, preferably between 1.5 and 5, and particularly preferably between 1.8 and 2.3.

The ratio of the mean fiber bundle length of the reinforcing fiber bundle fraction of the supporting body to the mean fiber bundle length of the reinforcing fiber bundle fraction of the friction layer is usually between 2 and 15, preferably between 3 and 10, and particularly preferably between 5 and 8.

The ratio of the mean fiber bundle length of the matrix fiber bundle fraction of the supporting body to the mean fiber bundle length of the matrix fiber bundle fraction of the friction layer is usually between 1.3 and 12, preferably between 1.5 and 7, and particularly preferably between 2 and 4.

The ceramics matrix of the at least two composite materials of the friction and sliding bodies according to the invention has in each case preferably at least one phase of at least one of the materials including carbon, silicon, boron, aluminum, zirconium and/or alloys from the group including silicon carbide, silicon nitride, silicon oxide, boron nitride, boron carbide, SiBCN, $Al_2O_3$, $ZrO_2$, TiC, iron silicides and other silicides, as well as glass ceramics. The two composite materials preferably have virtually the same phases. Particularly preferably, two composite materials of the friction and sliding bodies according to the invention have the same matrix of virtually only one of the aforementioned substances and alloys, and only very few regions with a compound very similar to the main phase. In other words, when an alloy is employed as a matrix only minor proportions of the phases of the individual alloying constituents are present in the matrix. Furthermore, the ceramics matrix of the two composite materials of the friction and sliding bodies according to the invention may also include additions of iron, chromium, titanium, molybdenum, nickel or aluminum.

CMC composite materials, which nowadays are already used for technical tasks that have to satisfy high requirements, preferably contain carbon fibers and graphite fibers since these are industrially widely available. They are for the most part produced by pyrolysis, based on PAN fibers, pitch fibers, mesophase pitch, viscose fibers, phenol fibers, polyphenylene fibers and hollow fibers. Accordingly, friction bodies and sliding bodies according to the invention are also preferably reinforced with carbon fiber bundles or graphite fiber bundles, and carbon fiber bundles and graphite fiber bundles are preferably used in the production processes according to the invention.

The friction bodies and sliding bodies according to the invention manifest their properties in a particularly pronounced manner when the at least two composite materials are C/SiC composite materials. In other words, they are materials having a ceramics matrix which substantially includes silicon, carbon and silicon carbide phases.

In most production processes according to the invention, the two different fractions of fiber bundles are in each case added for the production of the two composite materials during a mixing process of other components for the production of the composite material. Preferably, the two different fractions of fiber bundles are mixed during the mixing process with at least one carbonizable binder. Moreover, carbon particles, carbon black, coke, graphite, silicon, carbides, nitrides, iron suicides and other suicides as well as borides are, above all, added as fillers. In addition other binders, for example from the group including polyvinyl alcohols, methyl, ethyl and butyl celluloses, may also be added during the mixing process. The mixture for the production of the friction layer is then subjected to a granulation process.

The granulation of the mixture for the friction layer is preferably carried out in a ploughshare mixer with or without a knife head, in a fluidized bed mixer, in a mixing drum with or without a palletizing plate, or in several of these units disposed behind one another. The granules that are thereby formed are either then compressed directly into a molded body, or are first of all screened. Granules are then usually compressed to a mean diameter of 0.25 mm to 8 mm, preferably 0.8 mm to 4 mm, and particularly preferably 1.5 mm to 3 mm.

Binders from the group including resins and pitches are preferably used as carbonizable binders. Resins from the group including thermoplastics, phenol resins, furan resins, polyacrylate resins, polyimide resins, cyanate resins and epoxy resins are used, in particular as resins. Solid and liquid pitches, mesophase pitches, coal-tar pitches and petroleum pitches are used, in particular, as pitches. However, binders from the group including polysilanes, polycarbosilanes, polysilazanes, monosaccharides and polysaccharides, polyallyl carbodiimides, polysilyl carbodiimides, oils and tars may, for example, also be used as carbonizable binders.

In the case of the supporting body, the mass fraction of the fiber bundles used in the mixing process is normally overall 50 to 99% of the total mass of the mixture, 60 to 90% and particularly preferably 65 to 80% of the total mass of the mixture, and for the friction layer is normally overall 35 to 90% of the total mass of the mixture, preferably 45 to 85%, and particularly preferably 60 to 80% of the total mass of the mixture.

In the case of the supporting body, the mass fraction of the fiber bundles of the reinforcing fiber bundle fraction used in the mixing process is normally 20 to 80% of the total mass of the mixture, preferably 35 to 65%, and particularly preferably 42 to 55% of the total mass of the mixture, and for the friction layer is normally overall 0 to 55% of the total mass of the mixture, preferably 15 to 45%, and particularly preferably 30 to 40% of the total mass of the mixture. A variant of the friction bodies or sliding bodies according to the invention thus also resides in the outer friction layers containing, at least to some extent, only matrix fiber bundles and no second fraction of longer reinforcing fiber bundles.

In the case of the supporting body, the mass fraction of the fiber bundles of the matrix fiber bundle fraction used in the mixing process is normally 10 to 40% of the total mass of the mixture, preferably 15 to 35%, and particularly preferably 20 to 30% of the total mass of the mixture, and for the friction layer is normally overall 12 to 55% of the total mass of the mixture, preferably 20 to 45% (?) and particularly preferably 30 to 40% (?) of the total mass of the mixture.

The mixture for the supporting body obtained by the mixing process and the granules for the production of the friction layer that are obtained by the granulation process are for the most part then compacted. This compaction preferably takes place in a die stamping press, isostatic press, extrusion press, piston stroke press or in an extruder, for example a screw extruder. In this connection, the person skilled in the art adjusts the pressure acting on the mixture on the basis of his or her knowledge of compaction processes. Therefore, suitable composite materials for the friction and sliding bodies according to the invention are obtained at the end of the production processes. This compaction of the mixture or of the granules preferably takes place at elevated temperature if resins are present as binders in the mixture, particularly preferably at temperatures above the hardening temperature of the resin binders. It is, however, also possible to only then subject the compacted molded articles to a heat treatment.

Thus, when resins are used as a binder it is also possible, after the compaction, to subject the molded articles to a heat treatment above the hardening temperature of the resin binders in order to thereby harden the molded articles.

The binders in the resultant molded articles are for the most part carbonized in a further process stage. Production processes according to the invention for the production of friction or sliding bodies have a matrix which contains carbon and/or carbides, such as, for example, C/SiC composite materials.

Furthermore, the production processes according to the invention may also include process stages in which one or more substances carbonizable through the use of a CVI process or impregnation are incorporated into the pore system of the composite materials to be produced and the latter are then subjected to a carbonization stage. These process stages are preferably used when the friction or sliding bodies according to the invention are to be produced from CMC composite materials having a matrix which contains carbon and/or carbides.

The afore-described carbonization stages of the composite materials may then be followed by a further process stage which is the graphitizing of the carbonized preliminary products at temperatures above 2000° C.

This is then generally followed by a mechanical treatment of the molded parts which are obtained, in order to impart the final geometry and shape to the supporting body and friction layers.

The various composite materials of the friction and sliding bodies according to the invention are then joined to one another, at the latest following this process stage. An integral joining can already be produced by a combined compression during the compression of the compression molding material of the supporting body and granules for the friction layer. The composite that is thereby formed then passes through the conventional process stages of the production processes of CMC molded articles after the compression. Similarly, the supporting body and the friction layer can be joined after the hardening of the binders as CFK molded bodies, or after the carbonization and/or graphitization as CFC molded bodies. The joining can be effected, for example, by bonding, usually with carbonizable adhesives, preferably with resins and pitches from the group including thermoplastics, phenol resins, furan resins, polyacrylate resins, polyimide resins, cyanate resins, epoxy resins, solid and liquid pitches, mesophase pitches, coal-tar pitches and petroleum pitches and mixtures thereof. Particularly preferably, fiber bundles, in particular carbon fiber bundles and graphite fiber bundles having a length which preferably approximately corresponds to the length of the matrix fibers of the friction layer, are mixed with the adhesive that is used. If CFC molded bodies are joined to one another, this is then followed by at least one further carbonization stage, whereas if CFK molded bodies are joined to one another the carbonization of the adhesive normally takes place together with that of the molded parts. Another bonding variant resides in the CFC molded parts of the supporting body and the friction layer being placed on top of one another or clamped together, and then, in a final siliciding the SiC formation in the matrix leads to an integral joint. In this way, the materials of the supporting body and the friction layer may undergo transition into one another.

Production processes according to the invention for friction or sliding bodies with composite materials having a matrix that also contains silicon and/or silicides such as, for example, C/SiC composite materials, preferably include a final process stage involving a siliciding, after the joining of the supporting body and the friction layer. This final siliciding may be effected by the infiltration of liquid silicon or silicon alloys from the group including iron, chromium, titanium, molybdenum, nickel and aluminum silicides or the CVI deposition of silicon, silicon carbide or other silicon compounds. After the siliciding, the transition between the supporting body and the friction layer may continue to be very abrupt, or the layers may also undergo transition into one another.

The friction and sliding bodies according to the invention are used as brake discs and brake linings, in particular for machinery, aircraft, tracked vehicles and other vehicles, and as components of sliding bearings and sliding elements.

Other features which are considered as characteristic for the invention are set forth in the appended claims.

Although the invention is described herein as embodied in a friction body or sliding body formed from composite materials reinforced with fiber bundles and containing a ceramics matrix and a process for the production of a friction or sliding body, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

EXAMPLES

The behavior of brake discs that on one hand (Example 1) are formed only of a C/SiC composite material according to German Published, Non-Prosecuted Patent Application DE 199 44 345 A1, corresponding to copending U.S. application Ser. No. 09/663,582, filed Sep. 18, 2000, and that on the other hand (Example 2) have been produced as brake discs according to the invention from a composite material of a comparison sample as a supporting body and two friction layers which have been applied to both sides of the supporting body, will be compared below with the aid of examples.

The described brake discs are formed of C/SiC composite materials. However, C/SiC composite materials are only one example of the friction or sliding bodies according to the invention, which may also be formed of other CMC composite materials. According to the above-described illustrations, similar results should also be observed with other CMC systems.

The brake disc of comparison Example 1 is formed of a C/SiC composite material that was produced on the basis of German Published, Non-Prosecuted Patent Application DE 199 44 345 A1, corresponding to copending U.S. application Ser. No. 09/663,582, filed Sep. 18, 2000, and a production process disclosed in German Published, Non-Prosecuted Patent Application DE 197 10 105 A1, corresponding to U.S. Pat. Nos. 6,231,791 and 6,030,913.

The supporting body of the brake discs according to the invention of Example 2 is formed of the same C/SiC composite material as the brake discs of comparison example 1, though in each case with a friction layer on both outer sides. Fiber bundles according to the invention having other fiber lengths are used for purposes of reinforcement in this composite material.

The brake disc of comparison Example 1 as well as the supporting body of Example 2 and the friction layers of Example 2 have the following fiber bundle fractions:

TABLE 1

Composition of the fiber bundle fractions of the Examples

| Example | Matrix Fiber Bundle Fraction | | Reinforcing Fiber Bundle Fraction | |
|---|---|---|---|---|
| | Fiber Bundle Mass [%] | Mean Fiber Bundle Length [mm] | Fiber Bundle Mass [%] | Mean Fiber Bundle Length [mm] |
| 1 | 30 | 3 ± 1.5 | 12 | 15 ± 2.55 |
| Supporting Body of 2 | | | 18 | 11 ± 2.5 |
| | | | 40 | 8 ± 2.5 |
| Friction Layer of 2 | 50 | 1.5 ± 0.6 | 50 | 3 ± 1.5 |

The fiber bundle fractions used in the examples have the following fiber bundle thicknesses:

TABLE 2

Dimensions of the individual fiber bundle fractions of the Examples

| Mean Fiber Bundle Length [mm] | Mean Fiber Bundle Thickness [mm] |
|---|---|
| 1.5 ± 0.5 | 0.15 ± 0.1 |
| 3 ± 1.5 | 0.5 ± 0.4 |
| 8 ± 2.5 | 1.46 ± 0.7 |
| 11 ± 2.5 | 1.46 ± 0.75 |
| 15 ± 2.55 | 1.46 ± 0.8 |

The brake discs of the two examples were produced as follows:

First of all a prepreg was produced from 3-component carbon fiber bundles (3000 individual filaments), in which the carbon fibers were produced based on PAN fibers. For this purpose, the fiber bundles were woven into a twill fabric and the fabric was then impregnated in phenolic resin (resol type) and provided on both sides with a separating paper. The resin-impregnated fabric was next heated at 130° C. in order to bring about tackiness of the prepreg.

The prepreg sheets were then placed on top of one another and compressed to form a pressed body. This was then fired at 900° C. The firing curve exhibited a gradient of 5° C. per minute in a range between 400° C. and 600° C. The CFC body thus obtained was then, first of all, impregnated three times in succession, each time with a coal-tar pitch having a softening point of 60° C., and was then fired, likewise at 900° C., in order to compact it further.

The CFC body thus obtained was next first of all comminuted in a jaw crusher (manufacturer: Alpine Hosokawa) and then cut up in a cutting mill (manufacturer: Alpine Hosokawa) into fiber bundles. The fiber bundles were finally sorted in a tumbler screen (manufacturer: Allgaier) into individual fiber bundle fractions. Screen inserts (screen surface area 1.15 m$^2$) thereof had an internal mesh width of 0.5 mm, 1 mm, 2 mm, 3 mm, 4 mm and 6 mm according to ISO 9044. The fiber bundle fractions described above were obtained as a result of this screening process. A value before a ± sign in each case denotes half a half-width of the individual fractions, which are derived, with regard to the fiber bundle length and fiber bundle width, from the fiber bundle distribution of the mass of the fiber bundles of the individual fiber bundle fractions.

A mixture A of 70% of the total mass of fiber bundles according to the composition specified above and, as a binder, 21% of the total mass of phenol resin (resol type) and 9% of the total mass of coal-tar pitch (softening point: 230° C.) was then produced in a Z-arm kneader (manufacturer: Werner & Pfleiderer) for Example 1 and for the supporting body of Example 2. The mixtures were then compressed in a die stamping press at a specific pressure of 12 Kp/cm$^2$ and at a temperature of 130° C. into a molded body corresponding to the required geometry of the brake disc. The supporting body was correspondingly thinner in order to be subsequently able to apply the friction layers to both sides of the latter. The samples were then carbonized at 900° C. under a protective gas.

In the case of the friction layers of Example 2, a mixture B was first of all produced from 70% of the total mass of fiber bundles according to the composition specified above and 30% of the total mass of phenol resin (Novalak type) by mixing for one minute in an RO2-E type mixer from Eirich (Germany) at a rotational speed of 1000 rpm, the mixture then immediately being converted within 4 minutes into granules by increasing the rotational speed to 2000 rpm while subject to the constant addition of a 2% aqueous polyvinyl alcohol solution. The granule grains having a grain diameter of greater than 3 mm were then separated from the granules by a sieving process and the granules thus obtained with a maximum grain size of 3 mm were then compressed in a die stamping press under a specific pressing force of 9 Kp/cm$^2$ and at a temperature of 130° C. into discs 3 cm thick. In this case too the discs were carbonized at 900° C. under a protective gas.

The resultant molded bodies for the brake discs of Example 1, the molded bodies for the supporting bodies of Example 2, and the discs for the friction rings of Example 2 were then machined in order to give them their final shape and geometry.

In the case of the production of the brake discs of Example 2, the CFC supporting body and friction rings obtained in this way were then bonded with a fiber-containing composition, with each side of the supporting body being provided in each case with a friction layer. The fiber-containing composition is formed of 70 wt. % of a resol type phenol resin and 30 wt. % of fiber bundles of the fiber bundle fraction having a mean fiber bundle length of 1.5 mm. The composite body thus obtained is then re-carbonized at 900° C. under a protective gas.

The infiltration of the CFC brake disc bodies of both examples was then carried out at 1700° C. with liquid silicon in vacuo under a silicon supply equal to 1.5 times the sample mass. The SiC structure of the matrix of the brake discs was thereby produced.

Upon examining the surface of the brake discs of both examples, a significantly different surface structure can be seen. Whereas, on the surface, the brake discs of comparison Example 1 simply exhibit fiber bundles parallel to the surface, in the case of the brake discs of Example 2 according to the invention fiber bundles can also be recognized that at least penetrate further into the friction layer and in some cases even their cross-section can be observed on the surface.

Of particular interest, however, is the structure of the surface of the brake discs that have been subjected to continuous stress in vehicles, especially when exposed to high temperatures (for example mountain trips, racing conditions). The essential difference between the two Examples 1 and 2 can be seen in this case. Whereas the surface of the heretofore homogeneous brake discs exhibits a very rough profile over the course of time, in particular due to the burning-out of the fiber bundles, the surface of the brake discs according to the invention appears almost smooth and flat, even after intensive use. Of course, in this case too, burn-outs of fiber bundles cannot be avoided. However, these occur on a significantly smaller scale and are in most cases of reduced size, with the result that virtually the whole surface remains intact as a friction surface. Surprisingly, with the brake discs according to the invention it was not only possible to almost completely avoid the roughness of the brake disc surface due to burn-outs, but in addition it was also found that no exfoliation of the surface occurred despite the high thermal stress. The problem encountered with previous brake discs including a supporting body and a friction layer was thus solved for the first time. Furthermore, the properties of previous one-piece C/SiC brake discs were achieved virtually unchanged.

We claim:

1. A friction or sliding body, comprising:
at least first and second composite materials reinforced with fiber bundles and containing a ceramics matrix, said first composite material acting as a friction layer and forming an outside with an outer surface, and said second composite material acting as a supporting body and being joined areally to said first composite material;
said at least first and second composite materials having different fractions of fiber bundles, said fractions of fiber bundles being a reinforcing fiber bundle fraction and a matrix fiber bundle fraction with different mean fiber bundle lengths and an overall fiber bundle distribution with a minimum fiber bundle length of fiber bundles incorporated in said composite material, said minimum lying between said mean fiber bundle lengths of said reinforcing fiber bundle fraction and said matrix fiber bundle fraction;
said fiber bundle lengths of said fiber bundles incorporated in said first composite material being shorter than said fiber bundle lengths of said fiber bundles incorporated in said second composite material;
said fiber bundles of said first composite material having, on average, a distinct alignment perpendicular to said outer surface;
said outer surface having regions of free carbon with a maximum diameter of 1.2 mm;
said free carbon having a surface area with a total fraction being at most 35% of said outer surface; and
said outer surface having a fine crack structure and substantially no stresses in the vicinity of said outer surface.

2. The friction or sliding body according to claim 1, wherein said outer surface has a surface area, and said total fraction of said surface area of free carbon is between 2% and 35% of said surface area of said outer surface.

3. The friction or sliding body according to claim 1, wherein said outer surface has a surface area, and said total fraction of said surface area of free carbon is between 5% and 30% of said surface area of said outer surface.

4. The friction or sliding body according to claim 1, wherein said outer surface has a surface area, and said total fraction of said surface area of free carbon is between 15% and 25% of said surface area of said outer surface.

5. The friction or sliding body according to claim 1, wherein said outer surface has a surface area, and a fraction of said outer surface having said regions of free carbon with a maximum diameter of 1.2 mm is between 1.5% and 30% of said surface area of said outer surface.

6. The friction or sliding body according to claim 1, wherein said outer surface has a surface area, and a fraction of said outer surface having said regions of free carbon with a maximum diameter of 1.2 mm is between 4% and 25% of said surface area of said outer surface.

7. The friction or sliding body according to claim 1, wherein said outer surface has a surface area, and a fraction of said outer surface having said regions of free carbon with a maximum diameter of 1.2 mm is between 12% and 20% of said surface area of said outer surface.

8. The friction or sliding body according to claim 1, wherein said friction layer is disposed on one side of said supporting body.

9. The friction or sliding body according to claim 1, wherein said friction layer is one of two friction layers formed of the same composite material, and each of said friction layers is disposed on a respective side of said supporting body.

10. The friction or sliding body according to claim 1, which further comprises several friction layer elements disposed next to one another on said supporting body.

11. The friction or sliding body according to claim 1, wherein said fiber bundles have at least one protective layer.

12. The friction or sliding body according to claim 1, which further comprises at least one of nanofibers, whiskers and nanotubes reinforcing said composite materials instead of fibers in said fiber bundles.

13. The friction or sliding body according to claim 1, wherein said fiber bundles contain fibers selected from the group consisting of graphite fibers and carbon fibers.

14. The friction or sliding body according to claim 1, wherein said ceramics matrix of said composite materials contains only phases of silicon, carbon and silicon carbide.

15. The friction or sliding body according to claim 9, wherein at least one of said friction layers does not contain reinforcing fiber bundles.

16. The friction or sliding body according to claim 8, which further comprises a transition layer disposed between said friction layer and said supporting body.

17. The friction or sliding body according to claim 9, which further comprises transition layers each disposed between a respective one of said friction layers and said supporting body.

18. The friction or sliding body according to claim 11, wherein said protective layers of said fiber bundles of said supporting body and said friction layer are the same.

19. The friction or sliding body according to claim 11, wherein said at least one protective layer is formed of at least one material selected from the group consisting of carbon and graphite.

20. A process for the production of a friction or sliding body, which comprises:
providing at least first and second composite materials reinforced with fiber bundles and containing a ceramics matrix;
forming an outside of the friction or sliding body from the first composite material as a friction layer, and joining the second composite material areally to the first composite material as a supporting body wherein the outer surface having regions of free carbon with a maximum diameter 1.2 mm and said free carbon having a surface area with a total fraction being at most 35% of said outer surface; and outer surface having a fine crack structure and substantially no stresses in the vicinity of said outer surface;
producing the at least first and second composite materials from different fractions of fiber bundles as starting substances, the fractions of fiber bundles being a reinforcing fiber bundle fraction and a matrix fiber bundle fraction having different mean fiber bundle lengths with an overall fiber bundle distribution having a minimum fiber bundle length of fiber bundles incorporated in the composite materials, the minimum lying between mean fiber bundle lengths of the reinforcing fiber bundle fraction and the matrix fiber bundle fraction;
dimensioning the fiber bundle lengths of the fiber bundles incorporated in the first composite material to be substantially shorter than the fiber bundle lengths of the fiber bundles incorporated in the second composite material; and
producing the first composite material by mixing the two fiber bundle fractions together with a binder, and granulating after the mixing.

21. The process for the production of a friction or sliding body according to claim 20, which further comprises joining the friction layer to one side of the supporting body.

22. The process for the production of a friction or sliding body according to claim 20, wherein the friction layer is one of two friction layers formed of the same composite material, and the process further comprises joining each of the friction layers to a respective side of the supporting body.

23. The process for the production of a friction or sliding body according to claim 20, which further comprises placing several friction layer elements next to one another on the supporting body.

24. The process for the production of a friction or sliding body according to claim 20, which further comprises providing the fiber bundles with at least one protective layer.

25. The process for the production of a friction or sliding body according to claim 20, which further comprises reinforcing the composite materials with at least one substance selected from the group consisting of nanofibers, whiskers and nanotubes instead of the fibers contained in the fiber bundles.

26. The process for the production of a friction or sliding body according to claim 20, which further comprises using only fibers selected from the group consisting of graphite fibers and carbon fibers to produce the friction or sliding body.

27. The process for the production of a friction or sliding body according to claim 20, wherein the friction layer is at least one friction layer, and the process further comprises compressing granules having a mean diameter of 0.25 mm to 8 mm to produce the at least one friction layer.

28. The process for the production of a friction or sliding body according to claim 20, wherein the friction layer is at least one friction layer, and the process further comprises compressing granules having a mean diameter of 0.8 mm to 4 mm to produce the at least one friction layer.

29. The process for the production of a friction or sliding body according to claim 20, wherein the friction layer is at least one friction layer, and the process further comprises compressing granules having a mean diameter of 1.5 mm to 3 mm, to produce the at least one friction layer.

30. The process for the production of a friction or sliding body according to claim 20, which further comprises producing an integral connection between the supporting body and the friction layer as a result of joint compression of compression molding material of the supporting body and granules for the friction layer.

31. The process for the production of a friction or sliding body according to claim 20, which further comprises joining the supporting body and the friction layer to one another as molded parts selected from the group consisting of CFK molded parts and CFC molded parts, by bonding in a process stage.

32. The process for the production of a friction or sliding body according to claim 20, wherein the friction layer is at least one friction layer, and the process further comprises using only matrix fiber bundles to produce the at least one friction layer.

33. The process for the production of a friction or sliding body according to claim 22, which further comprises placing at least one transition layer between at least one of the friction layers and the supporting body.

34. The process for the production of a friction or sliding body according to claim 24, which further comprises forming the at least one protective layer from at least one substance selected from the group consisting of carbon and graphite.

35. The process for the production of a friction or sliding body according to claim 31, which further comprises carrying out the bonding step with carbonizable adhesives.

36. The process for the production of a friction or sliding body according to claim 35, wherein the carbonizable adhesives are resins and pitches with which the fiber bundles have been mixed.

37. The process for the production of a friction or sliding body according to claim 36, wherein the fiber bundles are carbon fiber bundles and graphite fiber bundles.

38. A brake disc or brake lining for machinery, aircraft, tracked vehicles, road vehicles, components of sliding bearings and sliding elements, comprising:

at least first and second composite materials reinforced with fiber bundles and containing a ceramics matrix, said first composite material acting as a friction layer and forming an outside with an outer surface, and said second composite material acting as a supporting body and being joined areally to said first composite material;

said at least first and second composite materials having different fractions of fiber bundles, said fractions of fiber bundles being a reinforcing fiber bundle fraction and a matrix fiber bundle fraction with different mean fiber bundle lengths and an overall fiber bundle distribution with a minimum fiber bundle length of fiber bundles incorporated in said composite material, said minimum lying between said mean fiber bundle lengths of said reinforcing fiber bundle fraction and said matrix fiber bundle fraction;

said fiber bundle lengths of said fiber bundles incorporated in said first composite material being shorter than said fiber bundle lengths of said fiber bundles incorporated in said second composite material;

said fiber bundles of said first composite material having, on average, a distinct alignment perpendicular to said outer surface;

said outer surface having regions of free carbon with a maximum diameter of 1.2 mm;

said free carbon having a surface area with a total fraction being at most 35% of said outer surface; and said outer surface having a fine crack structure and substantially no stresses in the vicinity of said outer surface.

* * * * *